(12) United States Patent
Wu (10) Patent No.: US 9,614,207 B2
(45) Date of Patent: Apr. 4, 2017

(54) BATTERY PACK HAVING RELIABLE TEMPERATURE CONTROL

(71) Applicant: Yuebin Wu, Shenzhen (CN)

(72) Inventor: Yuebin Wu, Shenzhen (CN)

(73) Assignee: Yuebin Wu, Shenzhen (CN)

( * ) Notice: Subject to any disclaimer, the term of this patent is extended or adjusted under 35 U.S.C. 154(b) by 158 days.

(21) Appl. No.: 14/694,136

(22) Filed: Apr. 23, 2015

(65) Prior Publication Data

US 2016/0315297 A1  Oct. 27, 2016

(51) Int. Cl.

| | |
|---|---|
| *H02P 1/00* | (2006.01) |
| *H01M 2/12* | (2006.01) |
| *H01M 2/10* | (2006.01) |
| *H01M 10/48* | (2006.01) |
| *H01M 10/63* | (2014.01) |
| *H01M 10/625* | (2014.01) |
| *H01M 10/6563* | (2014.01) |
| *H01M 10/613* | (2014.01) |
| *H01M 8/04007* | (2016.01) |
| *H01M 8/04014* | (2016.01) |
| *B60L 11/18* | (2006.01) |
| *H01G 11/80* | (2013.01) |
| *H01M 10/42* | (2006.01) |
| *H01M 10/6551* | (2014.01) |

(Continued)

(52) U.S. Cl.
CPC ....... *H01M 2/1077* (2013.01); *B60L 11/1874* (2013.01); *H01G 11/80* (2013.01); *H01M 2/1094* (2013.01); *H01M 8/04014* (2013.01); *H01M 8/04067* (2013.01); *H01M 10/425* (2013.01); *H01M 10/486* (2013.01); *H01M 10/613* (2015.04); *H01M 10/617* (2015.04); *H01M 10/625* (2015.04); *H01M 10/63* (2015.04); *H01M 10/6551* (2015.04); *H01M 10/6563* (2015.04); *B60K 1/04* (2013.01); *H01M 2220/20* (2013.01); *H01M 2250/20* (2013.01)

(58) Field of Classification Search
CPC .. H01M 2/1077; H01M 10/486; H01M 10/63; H01M 10/625; H01M 10/613; H01M 10/657; H01M 10/0525; H01M 10/06; H01M 10/345; H01M 8/04067; H01M 8/04014; H01M 2/1094; H01M 10/425; H01M 10/6551; H01M 10/617; H01M 2250/20; H01M 2/08; H01M 10/5016; H01M 2/1241; B60L 11/1874; B60K 1/04
USPC ........................................... 318/139; 429/56
See application file for complete search history.

(56) References Cited

U.S. PATENT DOCUMENTS

| | | | |
|---|---|---|---|
| 2012/0021260 A1* | 1/2012 | Yasui .................. | F28D 15/0275 429/53 |
| 2014/0178719 A1* | 6/2014 | Storc ........................ | B60K 1/04 429/56 |
| 2015/0325890 A1* | 11/2015 | Soong ................. | H01M 10/617 429/82 |

\* cited by examiner

*Primary Examiner* — Bentsu Ro
*Assistant Examiner* — Zemenay Truneh
(74) *Attorney, Agent, or Firm* — SV Patent Service (57) ABSTRACT

A battery pack includes a plurality of compartments filled with an inert gas and sealed in a thermally conductive casing, a plurality of battery units each comprising rechargeable batteries and each stored in one of the plurality of compartments, internal heat-exchange systems each of which can circulate the inert gas to exchange heat with the rechargeable batteries in the one of the plurality of compartments, and an external heat-exchange system positioned outside the thermally conductive casing which can exchange heat with the thermally conductive casing surrounding the one of the plurality of compartments.

17 Claims, 10 Drawing Sheets

(51) Int. Cl.
*H01M 10/617* (2014.01)
*B60K 1/04* (2006.01)

BATTERY PACK HAVING RELIABLE TEMPERATURE CONTROL

BACKGROUND OF THE INVENTION

The present application relates to batteries and battery packs, and in particular, to technologies ensuring safety and reliability of the batteries and the battery packs.

In recent years, electric vehicles (EVs) driven by electric motors have becoming increasingly popular. Usually, an electric vehicle uses a rechargeable secondary battery as an energy source for. A battery pack comprising multiple battery cells in a hard casing is mounted to a floor part of a vehicle body.

Typical battery cell packs used in electric vehicles employ a multitude (e.g., thousands) of individual battery cells organized in sub-units (sometimes referred to as modules or bricks) that are interconnected. The cells and modules are combined variously in series and parallel to provide sustained high-energy storage and output as desired for any particular application.

Conventional battery packs are usually comprised of rectangular shaped batteries closely packed in a single container. Although these battery packs are compact, their thermal management is very challenging. As a result, these battery packs are deficient in reliability and safety: if one battery cell that catches on fire (by short circuit, over charge, or overheating for example), it can quickly go out of control to inflame other battery cells in the battery pack.

Some conventional battery packs employ serpentine cooling tubes to guide cooling water to remove heat from the batteries, but these types of cooling systems are bulky and different to package in the battery system. Any leakage in the cooling conduit can produce disastrous result of circuit short. Some other conventional battery packs utilize air circulation to cool the batteries, but these systems may spread a local fire across the whole system.

Accordingly, there is a need for improved temperature control and safety for battery packs.

SUMMARY OF THE INVENTION

The present application discloses novel battery pack of rechargeable secondary batteries that effectively prevent the above described safety issues in the conventional battery packs. In one aspect, the disclosed battery pack isolates multiple groups of battery cells in separate fire-proof compartments to minimize thermal crosstalk between the different groups of battery cells. In another aspect, the compartments in the disclosed battery pack are sealed and filled with inert gas to minimize ignitability.

Importantly, the temperature of the disclosed battery pack is controlled by a combination of an internal heat-exchange system and an external heat-exchange system. The internal heat-exchange system is configured to circulate the inert gas to homogenize temperature distribution and cools the hot spots in the interior of the sealed compartments. The external heat-exchange system is configured to remove heat from the compartments of the battery pack to outside environment.

The presently disclosed systems and methods are applicable to rechargeable secondary batteries such as lithium-ion batteries, lead-acid batteries, nickel cadmium (NiCd) batteries, nickel metal hydride (NiMH) batteries, and lithium ion polymer (Li-ion polymer) batteries, and battery packs formed by these batteries.

In one general aspect, the present invention relates to a battery pack that includes a plurality of compartments filled with an inert gas and sealed in a thermally conductive casing, a plurality of battery units each comprising rechargeable batteries and each stored in one of the plurality of compartments, internal heat-exchange systems each of which can circulate the inert gas to exchange heat with the rechargeable batteries in the one of the plurality of compartments, and an external heat-exchange system positioned outside the thermally conductive casing which can exchange heat with the thermally conductive casing surrounding the one of the plurality of compartments.

Implementations of the system may include one or more of the following. At least one of the plurality of compartments can include a separation wall that defines a storage region for the rechargeable batteries in the one of the plurality of compartments and an entrance to the storage region. The internal heat-exchange system can draw the inert gas from the rechargeable batteries in the storage region and output the inert gas toward the entrance to the storage region in the one of the plurality of compartments. The internal heat-exchange system can produce circulation of the inert gas in a unidirectional path. The battery pack can further include internal walls configured to separate the plurality of compartments within the thermally conductive casing. The external heat-exchange system can include a semiconductor cooling device that can exchange heat with the thermally conductive casing in response to an electric voltage. Whether heat is removed from or transmitted to the thermally conductive casing can be controlled by a polarity of the electric voltage applied to the semiconductor cooling device. The external heat-exchange system can include a heat sink configured to exchange heat with the semiconductor cooling device. The external heat-exchange system can include a fan that can exchange heat with the semiconductor cooling device and the heat sink. The battery pack can further include thermal sensors each configured to measure temperature in one of the compartments. The external heat-exchange system can remove heat from the thermally conductive casing surrounding the one of the plurality of compartments if the temperature in one of the compartments can be above an operation temperature range. The external heat-exchange system can transfer heat to the thermally conductive casing surrounding the one of the plurality of compartments if the temperature in one of the compartments is detected to be below an operation temperature range. The rechargeable batteries can include one or more of lithium-ion batteries, lead-acid batteries, nickel cadmium (NiCd) batteries, nickel metal hydride (NiMH) batteries, lithium ion polymer (Li-ion polymer) batteries, fuel cell batteries, super capacitors, or flow batteries. The internal heat-exchange systems can be powered by the rechargeable batteries. The external heat-exchange systems can be powered by the rechargeable batteries.

In another aspect, the present invention relates to an electric vehicle that includes an electric motor configured to drive the electric vehicle; and a battery pack that can provide power to the electric motor. The battery pack includes a plurality of compartments sealed in a thermally conductive casing, wherein the compartments are filled with an inert gas; a plurality of battery units each comprising rechargeable batteries and each stored in one of the plurality of compartments; internal heat-exchange systems each of which can circulate the inert gas to exchange heat with the rechargeable batteries in the one of the plurality of compartments; and an external heat-exchange system positioned outside the thermally conductive casing which can exchange heat with the thermally conductive casing surrounding the one of the plurality of compartments.

Implementations of the system may include one or more of the following. The electric vehicle can further include a frame configured to support the motor, wherein the battery pack is mounted on the frame.

These and other aspects, their implementations and other features are described in detail in the drawings, the description, and the claims.

DETAILED DESCRIPTION OF THE INVENTION

Figure 1A:
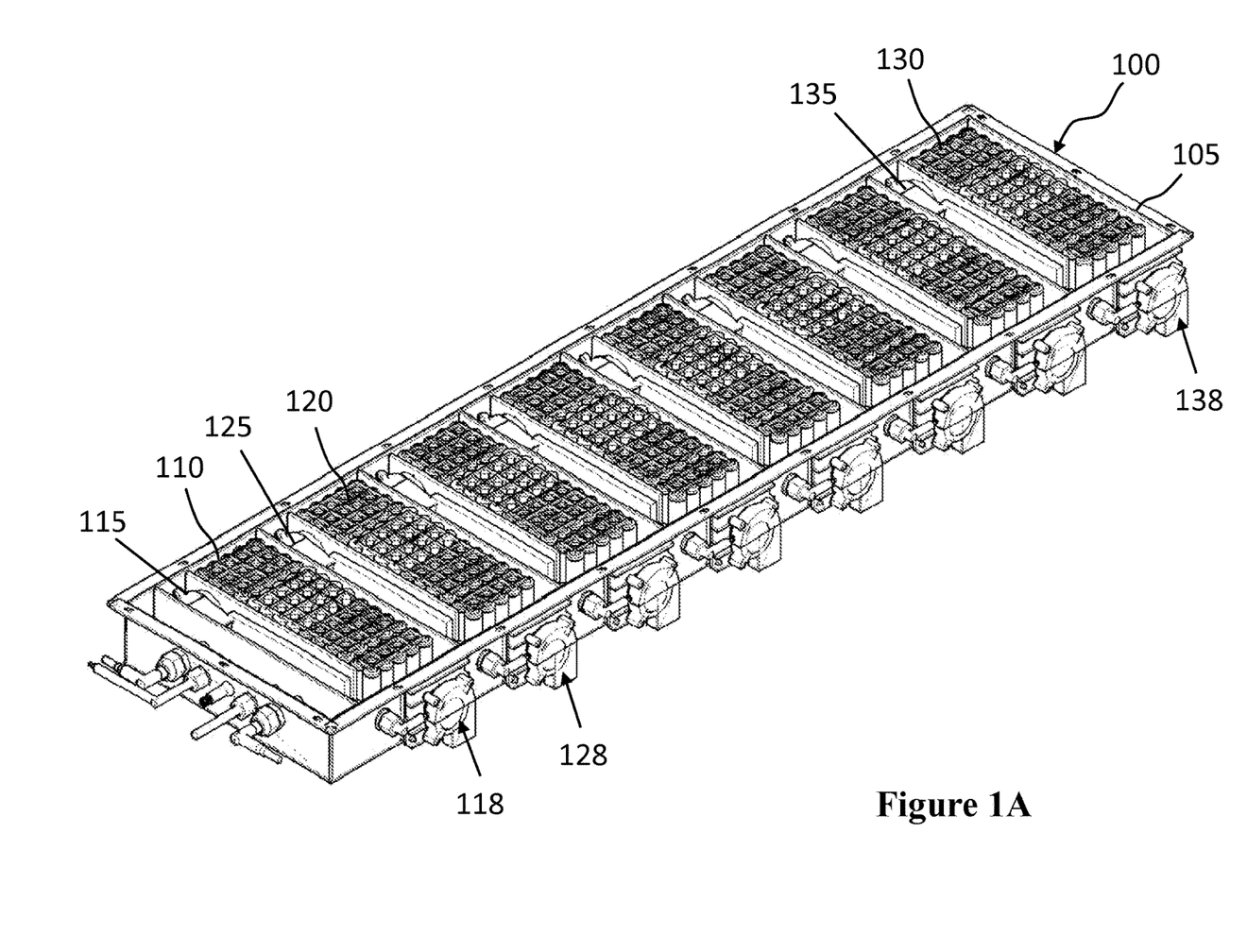
FIGS. 1A and 1B are respectively a perspective and a schematic top views for a battery pack comprising multiple compartments equipped with internal and external cooling in accordance with the present invention.
Figure 1B:
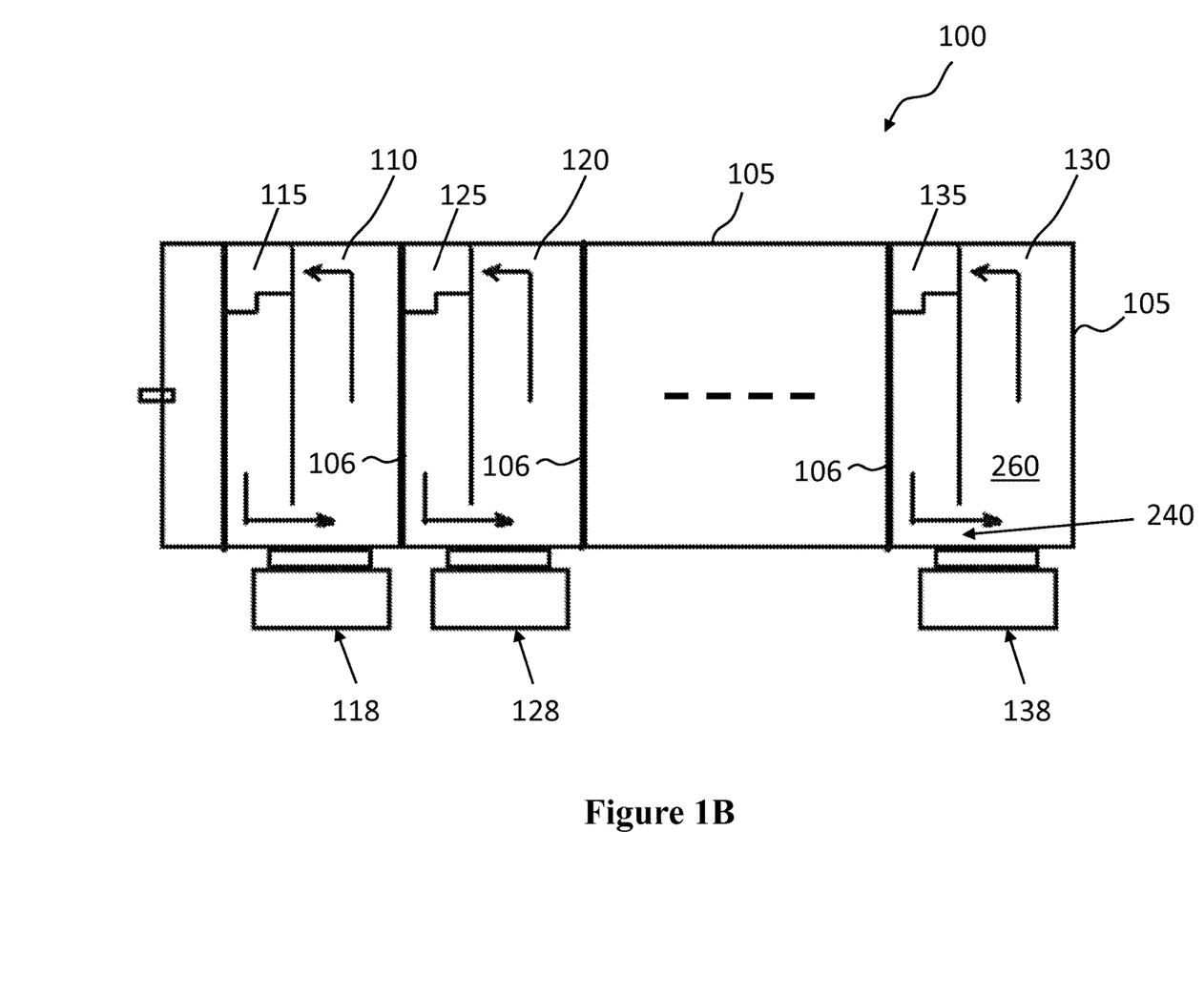

Referring to FIGS. 1A and 1B, a battery pack 100 includes a fire-proof and thermally conductive casing 105 and a plurality of compartments 110, 120, 130 within the casing 105 for holding multiple groups of batteries. The casing can be made of a metallic material such as aluminum alloy, stainless steel, iron, or an organic material embedded with metallic materials, etc. The compartments 110, 120, 130 are separated from each other by fire-proof internal walls 106 and from the outside by the casing 105. Moreover, the compartments 110, 120, 130 are first exhausted and then filled with an inert gas to minimize ignitability. The inert gas in each compartment 110, 120, 130 is separately sealed within its respective compartment. Examples of a suitable inert gas include purified argon gas, as well as helium, neon, krypton, xenon, or radon gases.

The compartments 110, 120, 130 are respectively equipped with internal heat-exchange systems 115, 125, and 135 as well as external heat-exchange systems 118, 128, 138. Each of the multiple groups of batteries defines a battery unit.

Figure 2A:
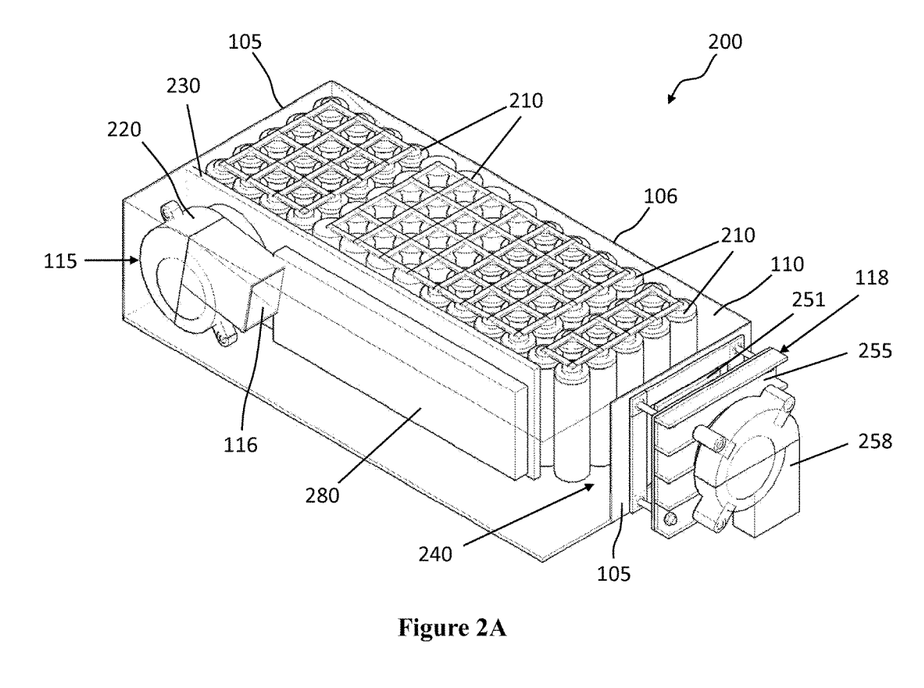
FIG. 2A is a perspective view of one compartment in the battery pack equipped with internal and external heat-exchange systems in accordance with the present invention.
Figure 2B:
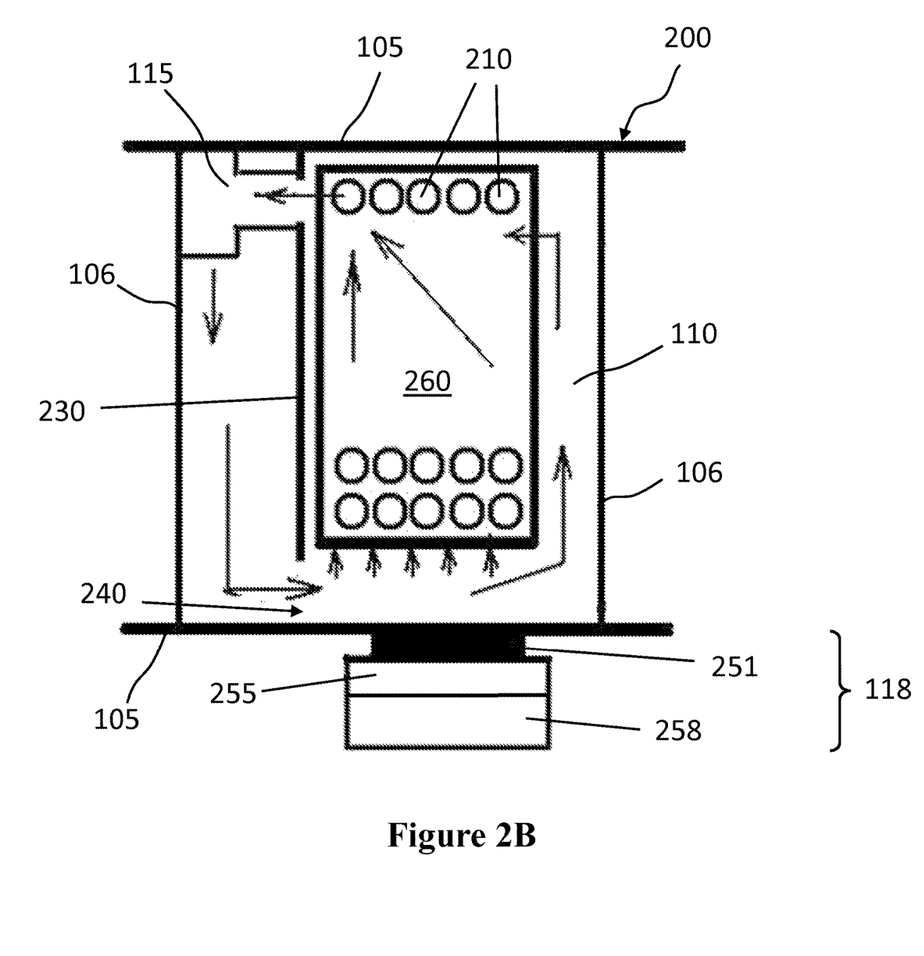
FIG. 2B is a detailed schematic top view showing the internal and external heat-exchange systems in one compartment in the battery pack with in accordance with the present invention.
Figure 2C:
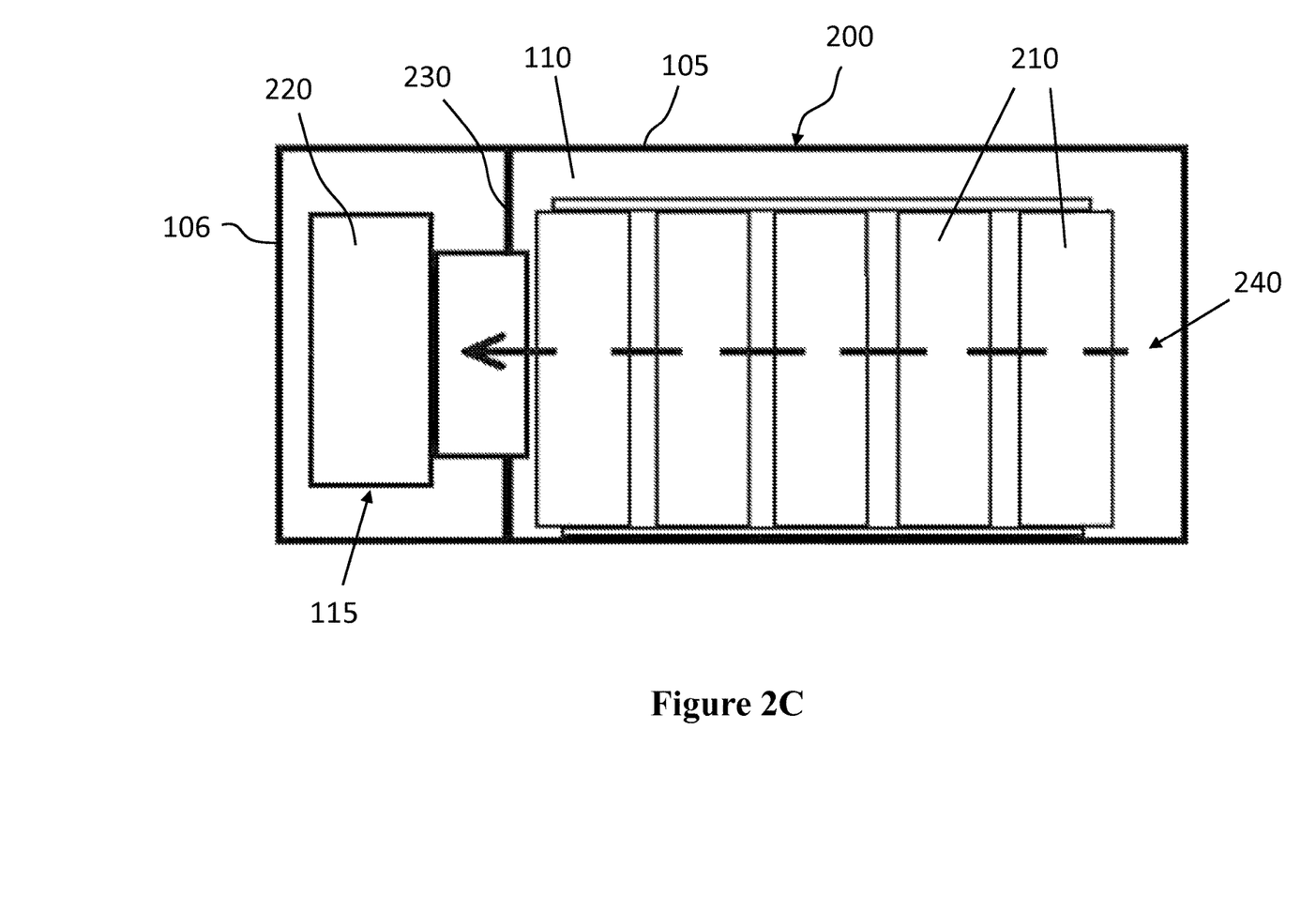
FIG. 2C is a partial schematic side view showing the internal heat-exchange system in one compartment in the battery pack in accordance with the present invention.

Referring to FIGS. 2A-2C, a battery unit 200 includes rechargeable batteries 210 in the same group in a compartment 110 defined by the casing 105 to the outside and internal walls 106 separating it from neighboring compartments (120 etc. in FIGS. 1A and 1B).

The internal heat-exchange system 115 includes an air pump 220 configured to pump and circulate the inert gas inside the compartment 110. The rechargeable batteries 210 are mounted in a portion of the compartment 110 defined by the casing 105, internal wall 106, and a separation wall 230 within the compartment 110. The air pump 220 creates a negative pressure region at its inlet and draws the inert gas from the battery storage region 260 and removes heat along with it. When the inert gas is pumped out of an outlet 116 of the air pump 220, it creates a positive pressure zone outside of the outlet 116. The inert gas is first guided along the side of the separation wall 230 away from the rechargeable batteries 210, and then enters the battery storage region through opening 240. The inert gas is then pushed by the positive pressure in the back and pulled negative pressure in the front through the rechargeable batteries 210, until the inert gas is drawn into the air pump 220 again.

As a result, the internal heat-exchange system 115 circulates the inert gas circulates in a unidirectional path within the compartment 110. If any of the rechargeable batteries 210 in the battery unit 200 overheats above its normal operation temperature range, the inert gas circulation is able to efficiently remove and redistribute the heat in the local hotspot to the rest of the compartment 110. Furthermore, the inert gas can effectively suppress the ignition of batteries 220.

In some embodiments, the internal heat-exchange system 115 is powered by the rechargeable batteries 210.

It should be noted that the internal heat-exchange system 115 works to homogenize temperature within each compartment 110, 120, 130. So in the event that the temperature is cooler in certain region within a compartment, heat can be brought into those regions to raise their temperatures while lowering temperatures of the previously hotter regions When an external heat-exchange system 118 works to heat a compartment (as described below), the internal heat-exchange system 115 can help to bring heat from the thermally conductive casing 105 to other regions of the compartment.

Figure 3:
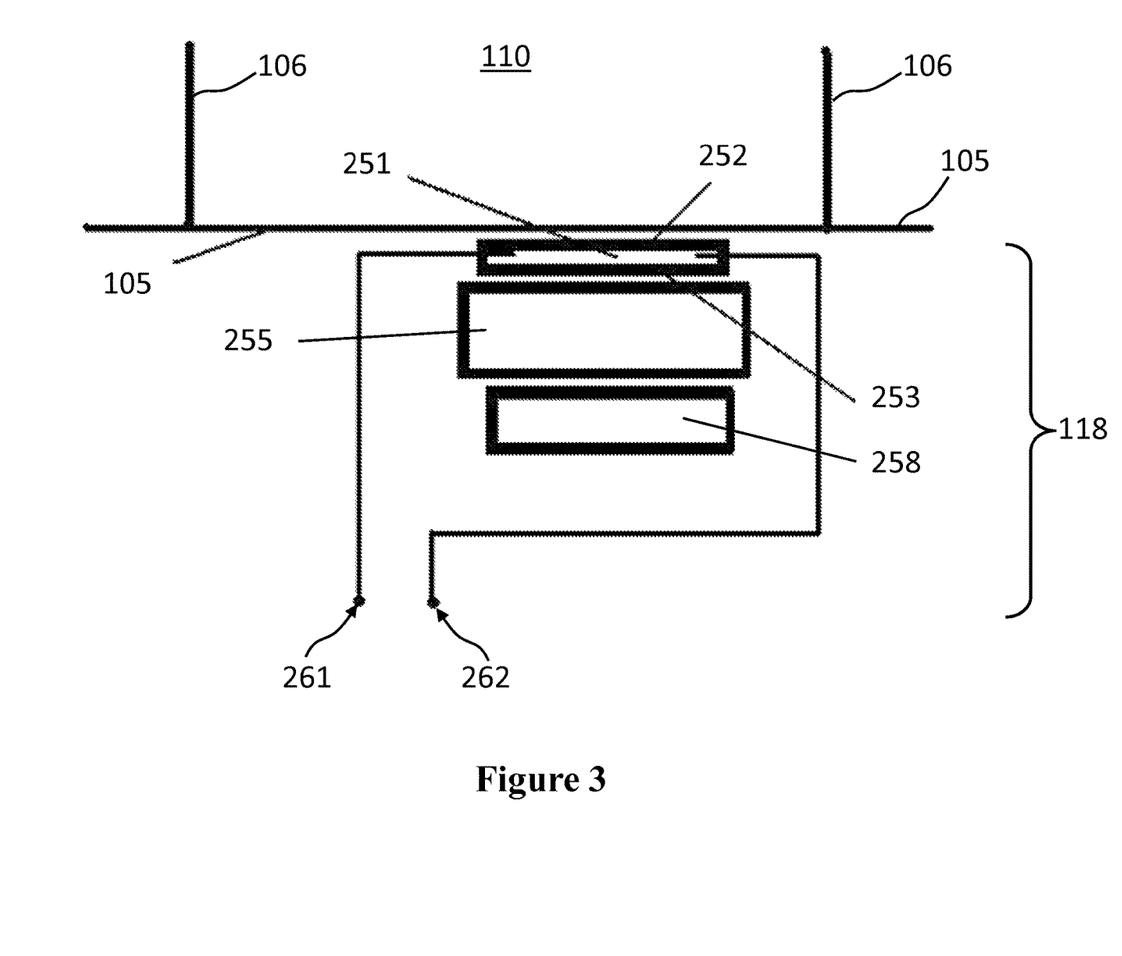
FIG. 3 is a partial schematic top view showing the external heat-exchange system in one compartment in the battery pack in accordance with the present invention.
Figure 4A:
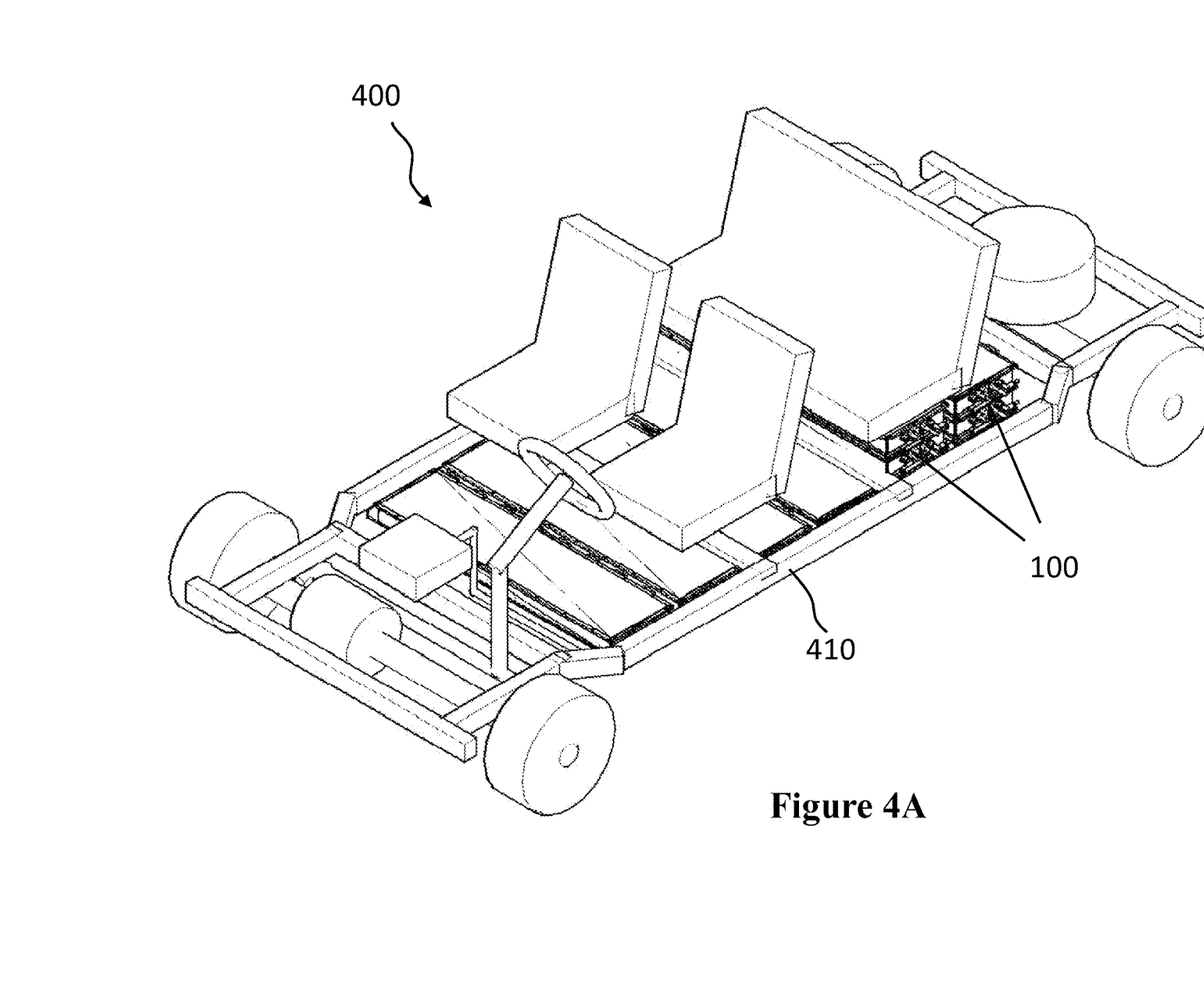
FIGS. 4A-4B are respectively perspective and side views of an electric vehicle equipped with the battery packs in accordance with the present invention.
Figure 4B:
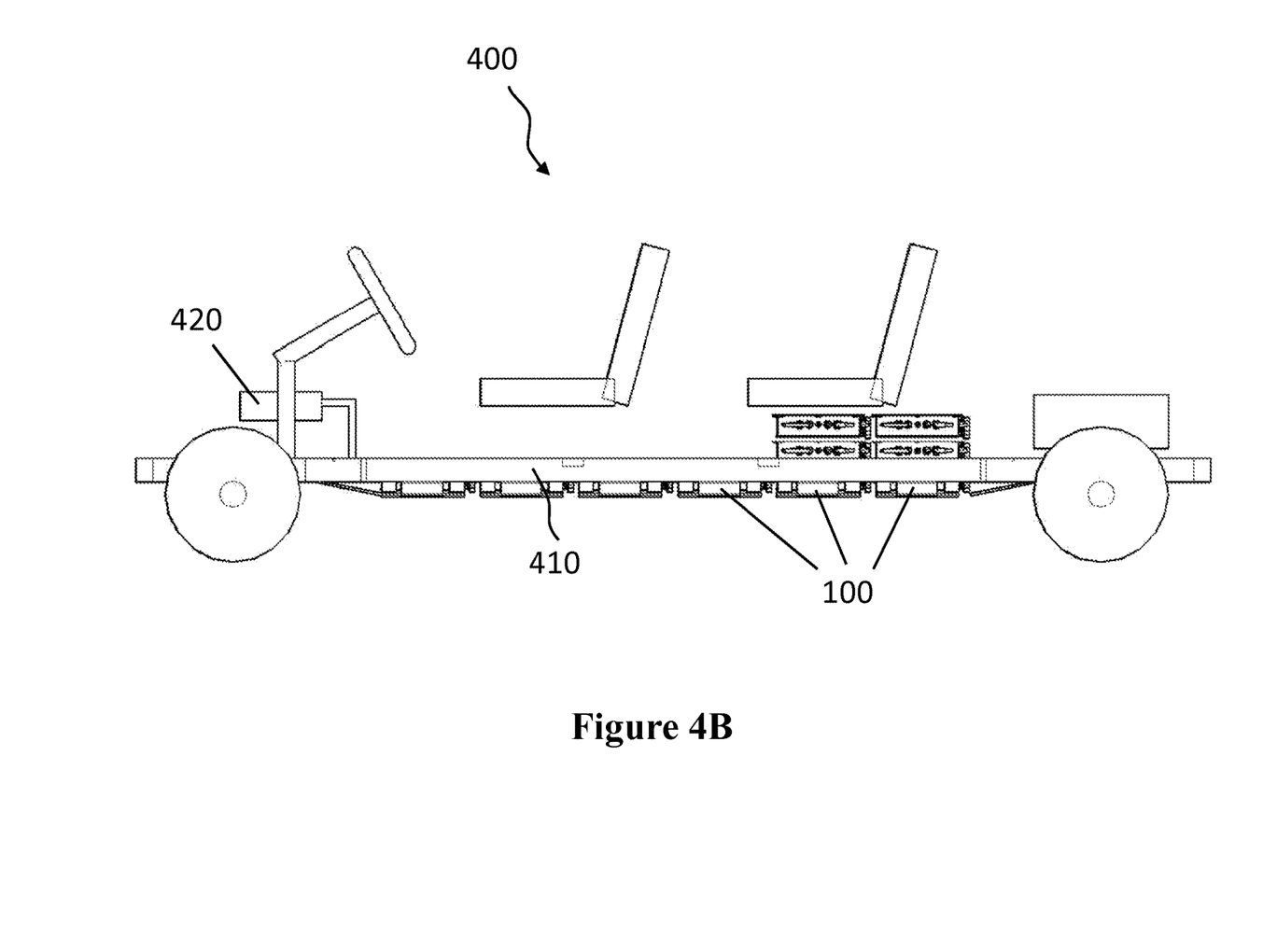
Figure 5:
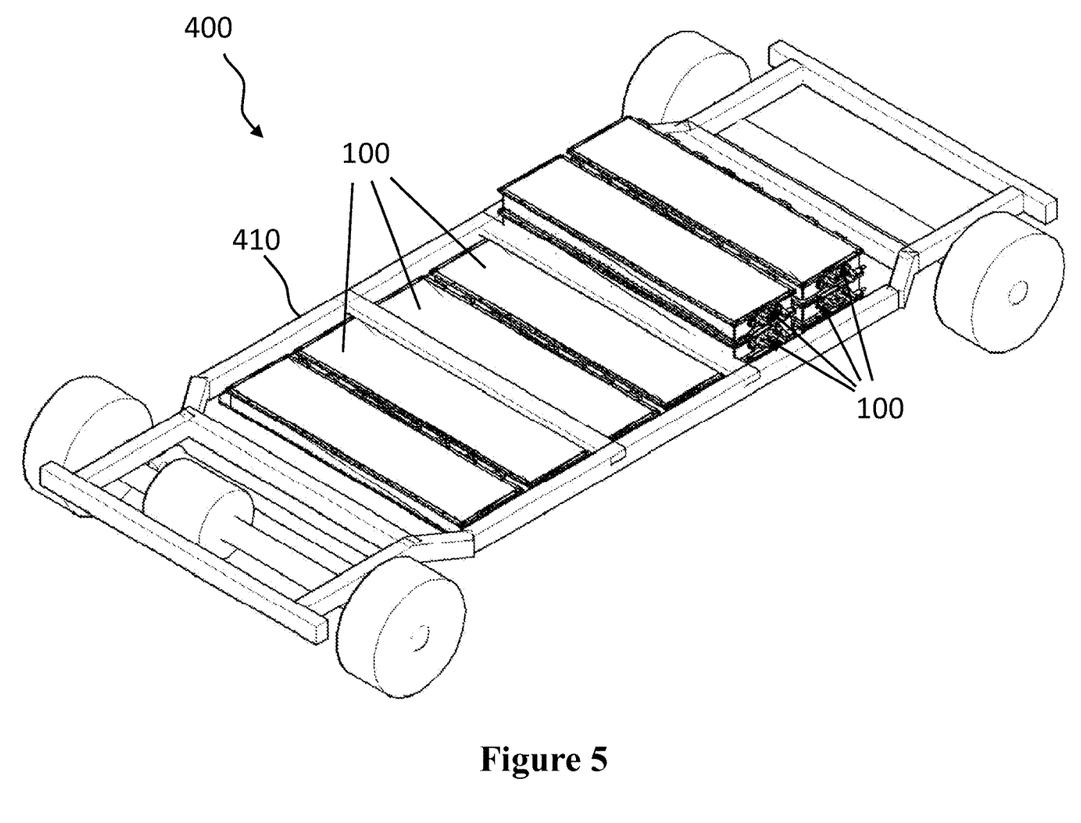
FIG. 5 is a perspective view of the base of an electric vehicle equipped with the battery packs in accordance with the present invention.
Figure 6:
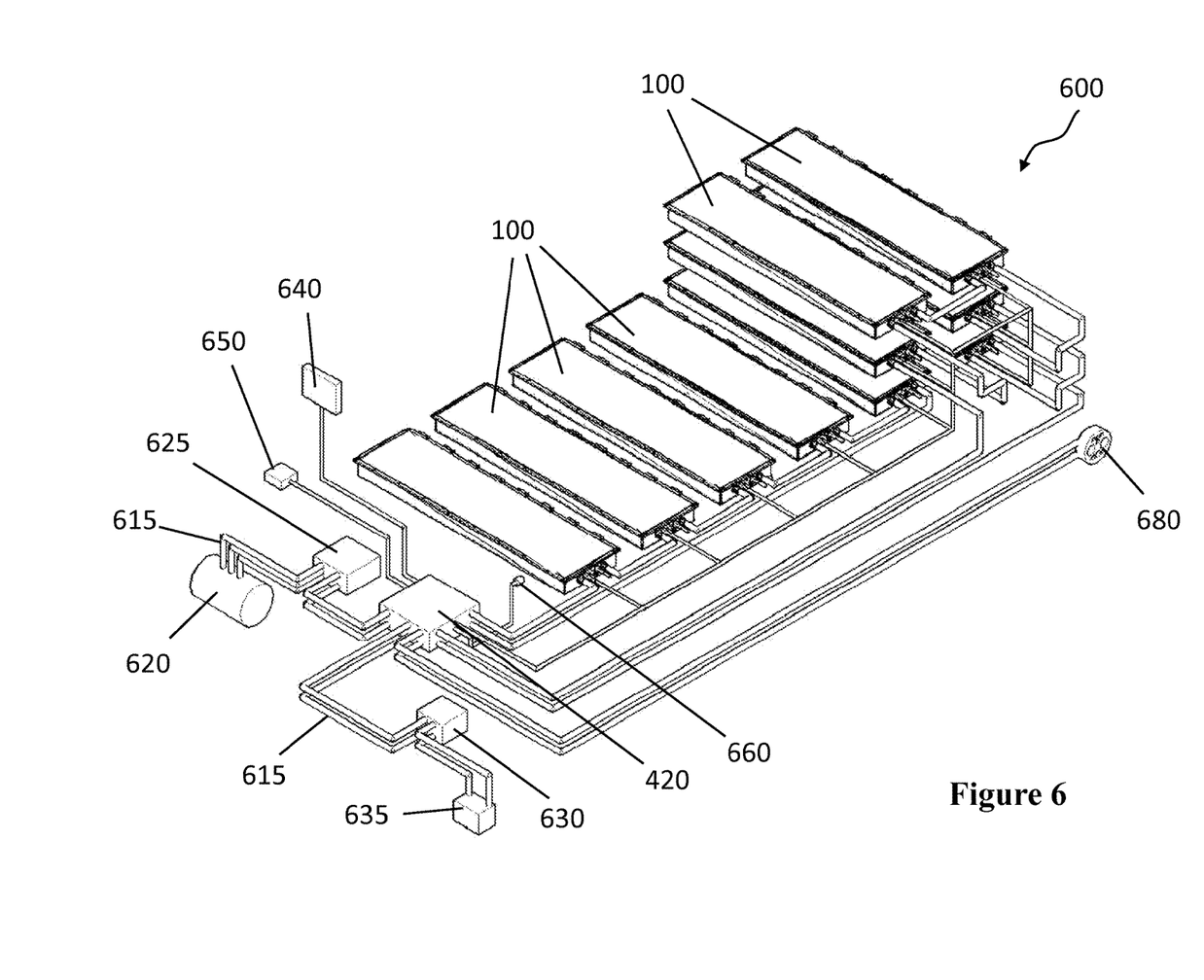
FIG. 6 is a schematic diagram of a battery system for an electric vehicle comprising the battery packs in accordance with the present invention.

Referring to FIGS. 2A-2B, 3, the external heat-exchange system 118 includes a semiconductor cooling device 251, a heat sink 255, and a fan 258. The semiconductor cooling device 251 can be implemented by Peltier cooling device comprising a cooling surface and a hot surface. With electric power supplied by terminals 261, 262, the semiconductor cooling device 251 can exhaust heat from the thermally conductive casing 105 towards the heat sink 255. The heat sink 255 is used to exchange heat with the semiconductor cooling device 251 (i.e. dissipate heat from the semiconductor cooling device 251 when removing heat from the thermally conductive casing 105, or as described below, transferring heat to the semiconductor cooling device 251 when heating the thermally conductive casing 105). Similarly, the fan 258 further exchanges heat from the heat sink 255 and the semiconductor cooling device 251 with the ambient. The fan 258 can be implemented by using turbo fans, axial and/or propeller fans, centrifugal (radial) fans, mixed flow fans, and cross flow fans, etc.

It should be noted, referring to FIGS. 1B, 2A, 2B, that the external heat-exchange system 118 is positioned to effectively remove heat from the portion of the thermally conductive casing 105 that is adjacent to the opening 240. In other words, the inert gas is first cooled at the entrance of the battery storage region 260 before the inert gas is blown through the gaps between the rechargeable batteries 210 in the battery unit 200. Thus cooler inert gas is blown into through the rechargeable batteries 210 to reduce the temperature of the rechargeable batteries 210 in addition to homogenize temperature throughout the compartment 110.

One advantage of the multi-compartment design is that the different compartments are thermally isolated from each other. If the extremely unlikely case that batteries in one compartment catches on fire, other compartments are not affected; it thus limits the total fuel available for burning and thus reduces the severity of fire damage. The chain reaction type of fires and explosions in conventional battery packs can be effectively prevented.

Moreover, the inert gas sealed in the compartments suppresses fire within a compartment. The circulation of inert gas lowers temperature of the hotspot without spreading fire as in some conventional systems.

The disclosed cooling system have the following other advantages: it does not involve running water and coolant circulation system, thus the system is compact and there is no risk of circuit shorting caused by leakage coolant. Moreover, the use of inert gas effectively removes moisture from inside the compartments, which prevents condensation and erosion in the system (in batteries, power lines, etc.).

It should be noted the external heat-exchange system 118 can work in the reverse direction, that is, bringing heat from the environment into the battery unit 200. Referring to FIG. 3, the direction of the heat transfer in the semiconductor cooling device 251 can be controlled by the polarity of the electric voltage bias (e.g. positive voltage bias leads to heat removal from the compartment and negative voltage bias results in heat into the compartment). In some cases, the temperature in the battery unit is below normal operation temperature, heat can be transferred into the battery unit to raise temperature in the battery cells. Thus the external heat-exchange system 118 can maintain the rechargeable batteries 210 within an operation temperature range.

In some embodiments, the external heat-exchange systems 118, 128, 138 are powered by the rechargeable batteries 210.

In some embodiments, referring to FIGS. 1A-2C, one or more thermal sensors (thermistors) (not shown) can be installed in each compartment 110, 120, 130 especially in the battery storage areas 260 to allow real time temperature monitoring across the battery pack 100 by a battery unit controller 280. In one implementation, a thermal sensor is installed adjacent to each rechargeable battery 210 in a battery unit 200 in a compartment 110.

In some embodiments, referring to FIGS. 1A, 1B, the battery pack 100 is that battery units in different compartments 110, 120, 130 can independently and redundantly generate power. The battery units in different compartments 110, 120, 130 can be connected in series or in parallel. The battery unit in each compartment can be dynamically shut off or turned by switches (not shown) on under the control of the battery unit controller 280 depending on the power needs and enduring reliability. In the rare event that batteries in one compartment are overheating, the whole battery unit in that compartment can be shut down to prevent further heating. Battery units in other compartments can continue generating power without interrupting service if the temperatures in the other compartments are in the normal operation range. The affected battery unit can resume operation after its temperature returns to within operation range.

It should be noted that the disclosed battery packs are compatible with different types of rechargeable secondary batteries such as lithium-ion batteries, lead-acid batteries, nickel cadmium (NiCd) batteries, nickel metal hydride (NiMH) batteries, and lithium ion polymer (Li-ion polymer) batteries, and battery packs formed by these batteries. Other examples of suitable rechargeable batteries include fuel cell batteries, super capacitors, and flow batteries.

In some embodiments, the disclosed battery packs are suitable for providing power to electric vehicles. Referring FIG. 4A-6, battery packs 100 can be installed on a bottom frame 410 at the bottom of an electric vehicle 400. A battery system 600 for the electric vehicle 400 can include a battery system controller 420, power cables 615, an electric motor 620 that drives the electric vehicle 400, a motor driver 625, a DC/DC converter 630, a low voltage auxiliary battery 635, a battery system display 640, a vehicle controller 650, a key signal input 660, and a vehicle power inlet 680. The battery system 600 outputs electric power through the battery system controller 420 to the motor driver 625, and the DC/DC converter 630 and the low voltage auxiliary battery 635. The motor driver 625 can convert DC voltage into AC voltage signals (performing the function of the DC/AC converter or inverter). The external charging system inputs electric power through the vehicle power inlet 680 and then via the battery system controller 420 into the batteries. Moreover, a digital controller collects data such as electric performance and operation temperatures of individual batteries, operation parameters of each battery unit. The motor driver 625 and the vehicle controller 650 monitor states and parameters of the vehicle (e.g. stop, start, moving forward, moving backward, acceleration, etc., and the central locking, doors and windows), and control the movement of the vehicle in response to the command of the driver.

One advantage of electric vehicles employing the disclosed battery pack is that EV's reliability is significantly improved. The disclosed battery system can avoid overheating or fires even after a period of demanding driving such as climbing onto a mountain or hauling weight. Moreover, the compact design of the disclosed battery pack allows higher battery capacity to be installed on an EV, thus extending driving range compared to EVs powered by conventional battery packs.

It should also be noted that the disclosed system is compatible with other configurations and layouts different from the example described above without deviating from the spirits of the present invention. The external heat-exchange systems can be implemented by other mechanisms than semiconductor cooling. The internal heat-exchange system can have different flow path from the ones shown above.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

What is claimed is:

1. A battery pack, comprising:
   a plurality of compartments sealed in a thermally conductive casing, wherein the compartments are filled with an inert gas;

a plurality of battery units each comprising rechargeable batteries and each stored in one of the plurality of compartments;

internal heat-exchange systems each configured to circulate the inert gas to exchange heat with the rechargeable batteries in the one of the plurality of compartments to exchange heat with the thermally conductive casing, wherein the internal heat-exchange systems are configured to homogenize temperature including lowering temperature of hotter regions within each of the plurality of compartments; and an external heat-exchange system positioned outside the thermally conductive casing and configured to exchange heat with the thermally conductive casing surrounding the one of the plurality of compartments.

2. The battery pack of claim 1, wherein at least one of the plurality of compartments comprises a separation wall that defines a storage region for the rechargeable batteries in the one of the plurality of compartments and an entrance to the storage region.

3. The battery pack of claim 1, wherein the internal heat-exchange system is configured to draw the inert gas from the rechargeable batteries in the storage region and output the inert gas toward the entrance to the storage region in the one of the plurality of compartments.

4. The battery pack of claim 1, wherein the internal heat-exchange system is configured to produce circulation of the inert gas in a unidirectional path.

5. The battery pack of claim 1, further comprising:
internal walls configured to separate the plurality of compartments within the thermally conductive casing.

6. The battery pack of claim 1, wherein the external heat-exchange system comprises a semiconductor cooling device configured to exchange heat with the thermally conductive casing in response to an electric voltage.

7. The battery pack of claim 6, wherein whether heat is removed from or transmitted to the thermally conductive casing is controlled by a polarity of the electric voltage applied to the semiconductor cooling device.

8. The battery pack of claim 6, wherein the external heat-exchange system comprises a heat sink configured to exchange heat with the semiconductor cooling device.

9. The battery pack of claim 6, wherein the external heat-exchange system comprises a fan configured to exchange heat with the semiconductor cooling device and the heat sink.

10. The battery pack of claim 1, further comprising:
thermal sensors each configured to measure temperature in one of the compartments.

11. The battery pack of claim 10, wherein the external heat-exchange system is configured to remove heat from the thermally conductive casing surrounding the one of the plurality of compartments if the temperature in one of the compartments is detected to be above an operation temperature range.

12. The battery pack of claim 10, wherein the external heat-exchange system is configured to transfer heat to the thermally conductive casing surrounding the one of the plurality of compartments if the temperature in one of the compartments is detected to be below an operation temperature range.

13. The battery pack of claim 1, wherein the rechargeable batteries include one or more of lithium-ion batteries, lead-acid batteries, nickel cadmium (NiCd) batteries, nickel metal hydride (NiMH) batteries, lithium ion polymer (Li-ion polymer) batteries, fuel cell batteries, super capacitors, or flow batteries.

14. The battery pack of claim 1, wherein the internal heat-exchange systems are powered by the rechargeable batteries.

15. The battery pack of claim 1, wherein the external heat-exchange systems are powered by the rechargeable batteries.

16. An electric vehicle, comprising:
an electric motor configured to drive the electric vehicle; and
a battery pack configured to provide power to the electric motor, comprising:
a plurality of compartments sealed in a thermally conductive casing, wherein the compartments are filled with an inert gas;
a plurality of battery units each comprising rechargeable batteries and each stored in one of the plurality of compartments;
internal heat-exchange systems each configured to circulate the inert gas to exchange heat with the rechargeable batteries in the one of the plurality of compartments to exchange heat with the thermally conductive casing, wherein the internal heat-exchange systems are configured to homogenize temperature including lowering temperature of hotter regions within each of the plurality of compartments; and
an external heat-exchange system positioned outside the thermally conductive casing and configured to exchange heat with the thermally conductive casing surrounding the one of the plurality of compartments.

17. The electric vehicle of claim 16, further comprising:
a frame configured to support the motor, wherein the battery pack is mounted on the frame.

* * * * *